March 20, 1934.  H. M. HILL  1,951,412
PROCESS AND APPARATUS FOR PREPARATION OF FROZEN COMESTIBLES
Filed Feb. 23, 1929   3 Sheets-Sheet 1
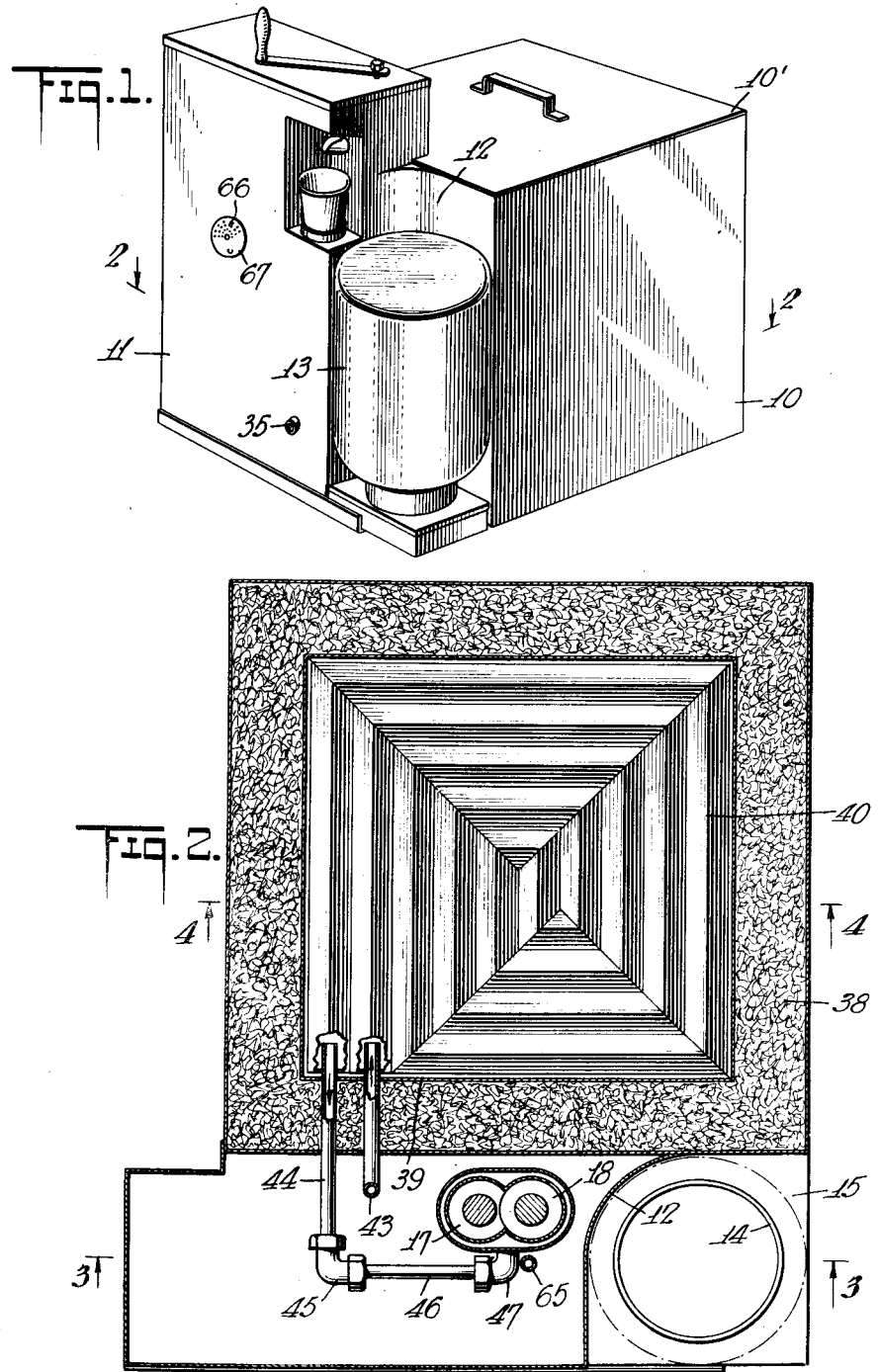
INVENTOR
*Herbert M. Hill.*
BY
*Dean, Fairbank, Obright & Hirsch*
*his* ATTORNEYS March 20, 1934.  H. M. HILL  1,951,412
PROCESS AND APPARATUS FOR PREPARATION OF FROZEN COMESTIBLES
Filed Feb. 23, 1929  3 Sheets-Sheet 2
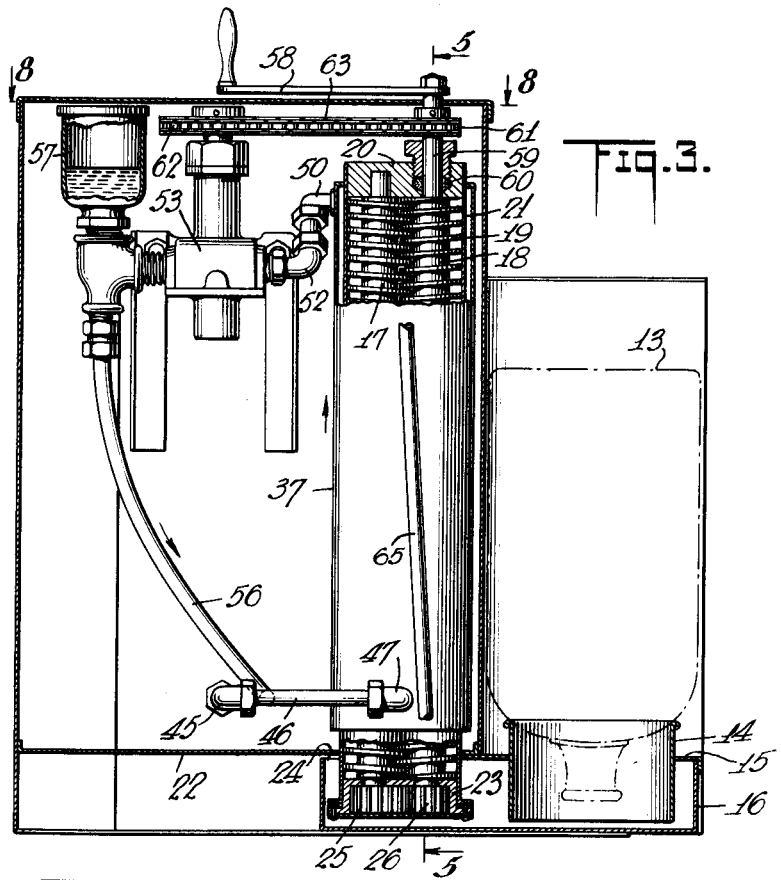
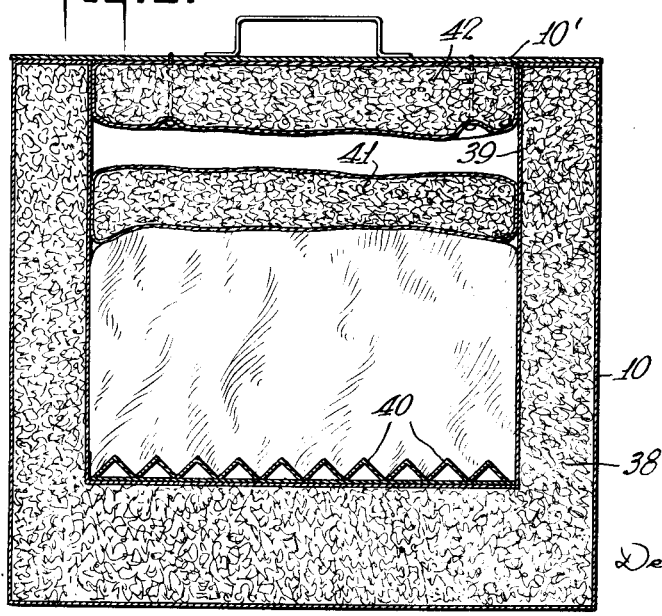
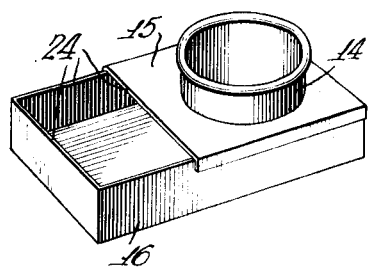
INVENTOR
*Herbert M. Hill.*
BY
*Dean, Fairbank, Obrieght, Hirsch*
*his* ATTORNEYS.

March 20, 1934. H. M. HILL 1,951,412
PROCESS AND APPARATUS FOR PREPARATION OF FROZEN COMESTIBLES
Filed Feb. 23, 1929 3 Sheets-Sheet 3
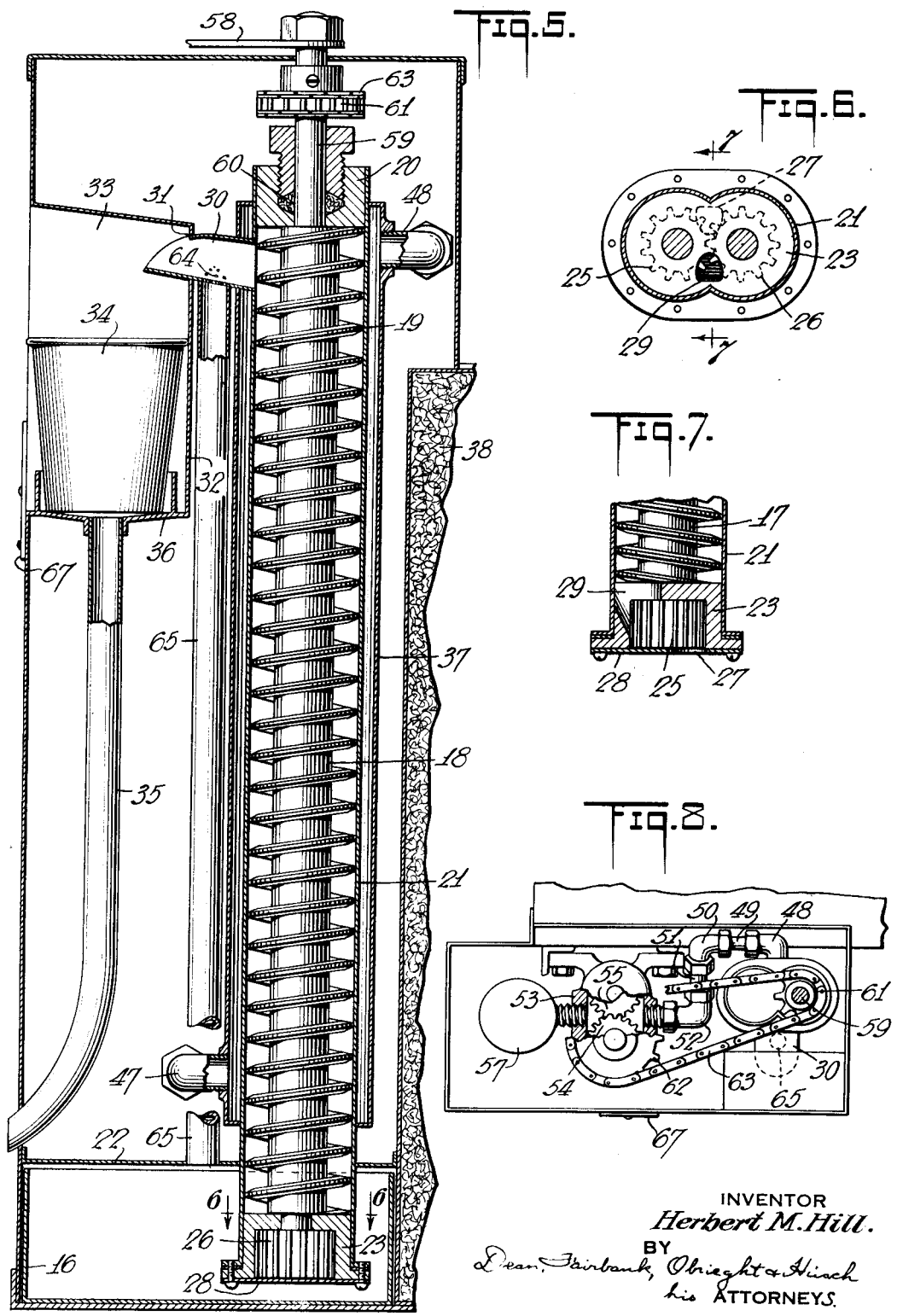
INVENTOR
Herbert M. Hill.
BY
Dean, Fairbank, Obrecht & Hirsch
his ATTORNEYS.

Patented Mar. 20, 1934

1,951,412

UNITED STATES PATENT OFFICE 1,951,412

PROCESS AND APPARATUS FOR PREPARATION OF FROZEN COMESTIBLES

Herbert M. Hill, Leonia, N. J.

Application February 23, 1929, Serial No. 342,133

21 Claims. (Cl. 62—114)

My present invention is concerned with refrigeration, more especially with the preparation of frozen comestibles.

It is an object of the invention to produce more particularly a frozen confection, which shall be of unusual smoothness and uniformity.

Another object is to provide a method and apparatus for producing such product, expeditiously, almost instantly upon demand direct from the syrup or mix, without the need for special scraping operations or removal of dashers or stirrers, or transfer from vessel to vessel, or to a chill room in the course of manufacture.

Another object is to provide apparatus which, while it may be embodied in a large manufacturing plant or installation for mass production, is susceptible of economical use in small units, and the operation and maintenance of which requires little or no skill and by which the product can be produced without waste.

In a preferred application of the invention, the syrup or mix is fed through a continuous conveyor in heat-interchange relation with a chill jacket or chamber through which a brine is pumped, which brine is chilled by congealed gas preferably carbon dioxide snow or ice. The conveyor is of helical type comprising in the preferred embodiment, a pair of inter-meshing rolls with helical ridges unitary therewith, which propel the mass while crushing it as it is being frozen, to be delivered as a finished end product through a spout at the outlet end. Preferably the conveyor feeds upward and there is sufficient clearance between the intermeshing ridges thereby to drain back any unfrozen liquid, when the machine is out of operation, thus preventing freezing of the apparatus.

In the accompanying drawings in which is illustrated the application of the invention to a small hand-operated unit, Fig. 1 is a perspective view showing the exterior of the unit, Fig. 2 is a transverse sectional view taken along the line 2—2 of Fig. 1, Fig. 3 is a transverse sectional view taken on line 3—3 of Fig. 2, Fig. 4 is a transverse vertical view taken on line 4—4 of Fig. 2, Fig. 5 is a fragmentary vertical sectional view taken on line 5—5 of Fig. 3, Fig. 6 is a transverse sectional view of a detail, taken on line 6—6 of Fig. 5, Fig. 7 is a fragmentary vertical sectional view taken on line 7—7 of Fig. 6, Fig. 8 is a transverse sectional view taken on line 8—8 of Fig. 3, and;

Fig. 9 is a perspective view of the feed trough for the syrup.

Referring now to the drawings, the installation includes generally an ice chest 10 having adjacent thereto, a freezing compartment 11 in direct contact therewith, the chest and the compartment determining a corner niche 12 therebetween for the inverted bottle 13 which contains the syrup or mix. The mouth of said bottle is disposed in the neck 14 on the cover 15 of a removable trough or drawer 16 (Fig. 9) slidable into the lower end of the freezing compartment.

In the freezing compartment, there is disposed preferably a vertical conveyor comprising a pair of upstanding rolls 17 and 18, each having a helical outstanding beveled ridge 19 thereon, said ridges intermeshing, and providing substantial clearance between the surfaces of the ridges, as best shown in Fig. 3. The rolls have journal bearings in a head 20 at the top of the encircling case 21 therefor, snugly engaging the ridges 19 and secured near its lower end to a false bottom 22 of the compartment. The rolls 17 and 18 bear at their lower ends in a casing structure 23 closing the lower end of the case 21 and extending downward into the trough 16 through the opening 24 in the cover thereof. Casing structure 23 houses the gears 25 and 26 respectively fixed to the lower ends of the rolls 17 and 18 and constituting a gear pump. As best shown in Fig. 7, the gear pump case has an inlet port 27 through a cover plate 28 at the flanged lower end of casing 23 and an outlet port 29, feeding the output of syrup derived thereby from the trough, to the composite helical passage determined between the two rolls 17 and 18.

The upper end of the case 21 has a delivery spout 30 protruding through a port 31 in the back wall 32 of an alcove 33 which supports the paper cup 34 or other container into which the frozen product is to be delivered. A waste or drain pipe 35 from the bottom 36 of the alcove allows drippings to escape, should operation occur without a cup 34 in place.

The mass is frozen in its traverse upward along the conveyor. For this purpose, an outer case 37 encircles the case 21 in spaced relation therewith, said case with the hollow space therebetween determining a chill jacket for circulation of the chilling brine therethrough. The brine delivers its heat to the ice chest 10. This chest is double-walled, comprising an outer box 10 and an inner box 39, as best shown in Fig. 2 and Fig.

4, a substantial mass 38 preferably of kapok or equivalent insulating material filling the space.

The brine circulating system preferably includes a coiled pipe resting on the bottom of the inner box 39 and supporting the heat abstracting ice, which is congealed gas, preferably carbon dioxide snow or ice. Preferably the pipe 40 is formed as a re-entrant rectangular spiral covering the entire bottom of the ice chest 38, the pipe being preferably, as shown, triangular in cross-section. The ice is preferably covered with a usual ice blanket 41 and the chest has a removable insulating cover 42. The brine is circulated through a system of piping including a pipe 43 feeding into the ice chest and a pipe 44 delivering from the ice chest, the latter pipe through elbow 45, pipe 46 and union coupling 47 feeding into the lower end of the chill jacket 21—37 about the conveyor 17—18. The brine leaves the upper end of the conveyor by way of a union coupling 48, pipe length 49, elbow 50, pipe length 51 and elbow 52 to the casing 53 of a brine pump, preferably a gear pump having a driving gear 54 and a driven gear 55. The gear pump propels the brine onward through return pipe 56 back into the ice chest through pipe 43. A sealed cup 57 mounted near the outlet of the gear pump constitutes an expansion chamber into which brine rises due to expansion by warming and from which the brine flows to maintain the pipe system full when it contracts due to chilling.

A crank handle 58 on top of the freezing compartment serves as the motive means for the conveyor, the syrup pump and the brine pump as well. Handle 58 is keyed to the upwardly protruding end of the shaft 59 of rod 18, said shaft protruding through a packed gland 60 at the head 20 of the conveyor housing. By a drive connection including a driving sprocket wheel 61 on shaft 59, a driven sprocket wheel 62 on brine pump 53 and a connecting sprocket chain 63, the brine pump 53 is driven from the shaft 59, which latter drives the roll 18 and the driving gear 26 of the syrup pump, from which the driven gear 25 and the driven conveyor roll 17 are driven.

Inasmuch as carbon dioxide snow or ice has a freezing temperature of minus 114 degrees F., I prefer, instead of the usual brine, to employ either grain alcohol or a petroleum product, such as gasoline or kerosene, the freezing points of both of which are well below that of carbon dioxide snow. Gasoline is particularly desirable because at the low temperature of operation in the brine system, it becomes somewhat more viscous and has excellent lubricating properties, maintaining the brine pump well lubricated. I prefer, as shown, to dispose the brine pump at the outlet or exit of the chill jacket 21—37 where the brine has a maximum temperature so that the pump would not be subjected to the lower temperature of the brine adjacent to lower end of said jacket.

The operation proceeds as follows: As the handle 58 is slowly turned, syrup or mix from the inverted bottle 13 is pumped at room temperature by the gear pump 25—26 into the conveyor. Simultaneously therewith, chilled brine is circulated by pump 53 upward through jacket or compartment 21—37. The brine comes into intimate heat interchange relation with the thin stream of syrup held between the helical ridges 19 of the conveyor and the case 21, and such syrup rapidly gives up heat. The partially frozen viscous product is lifted by the conveyor and simultaneously fed around the individual helical grooves for a relatively long path of travel in contact with the chill jacket 21—37, so that the mass gradually becomes stiffer, as it passes up the conveyor. Throughout this lifting action, the product is being crushed between the engaging helical ridges of the conveyor, which crushing action is enhanced, due to the natural expansion of the product in freezing, so that adequate comminution of the mass occurs throughout, and the final product ejected through the spout 30 is substantially homogeneous and devoid of large crystals of ice, frequently found in water ice prepared by ordinary processes.

The conveyor has a positive propulsive action on partly or wholly frozen material and on solid or plastic material. Liquid, however, tends to drain back and is only impositively advanced. Accordingly, as the syrup becomes frozen in the conveyor, it rapidly rises to and escapes from the spout, and thus will not become too hard for immediate consumption. After operation is interrupted, any liquid remaining in the conveyor drains back to the trough 16, through the substantial clearance between the helical ridges. The spout 30 also has small drain holes 64 over the upper end of a drain pipe 65 lengthwise of the compartment and delivering through false bottom 22 into the trough 16. Accordingly, the frozen product is delivered from spout 30, substantially solid or plastic without admixture of slush.

In the course of propulsion by the brine pump through the spiral passage 40 at the bottom of the ice chest, the brine is chilled. The chilling action is particularly effective in view of the large area of pipe exposed to contact with the congealed carbon dioxide and due also to the fact that in sublimation, heavy chilled carbon dioxide gas tends to pass downward into direct contact with pipe 40 and effectively to deliver up its cold thereto.

The pipe or conduit means 40 may be provided by a flat member or sheet of suitable material stamped or otherwise shaped to form parallel corrugations arranged as shown in Figure 2, the edges of these corrugations on the lower face of the member resting on the bottom of the box 10 and the grooves of said lower face between said edges forming a bore or passage through said means.

Preferably, the inlet and outlet pipes are not soldered in the walls of the inner chest 39, but afford a crevice thereat, so that some of the carbon dioxide gas escapes therethrough into the kapok within the hollow wall of the chest and not only dries the kapok lining to maintain its heat-insulating properties, but, moreover, serves itself, as a heat insulator by filling minute interstices left between the fibers of kapok. The balance of the $CO_2$ gas finds its way into the substantially airtight chamber 11, cooling the apparatus therein, and a certain amount of the $CO_2$ gas escapes from under the rim 10' of the icebox top.

The proportioning of the area of chilled surface in the ice chest, the relative rates of feed of the syrup pump 25—26 and of the brine pump 53 and the length of the chill jacket 21—37 may be coordinated in approximately the ratios indicated on the drawings, so that when the handle is turned at the rate of about two revolutions per second there is produced a water ice product that has the consistency of ice cream ready for consumption. Since the rate at which the gear pump 25—26 propels the syrup is proportional to that at which pump 53 propels the brine, the refrigeration is reliably performed whether the handle be turned faster or slower. It will be understood that the ratios of the elements may be changed to produce a harder product or a softer product in accordance with requirements.

In actual operation, the machine will by slow turning of the handle 58, feed the frozen product almost instantly and at the rate of about a pint per minute. Such slow turning also avoids the generation of any substantial heat by friction between the conveyor rolls or between said rolls and the substance being frozen. Obviously, by appropriate enlargements, and mechanical instead of hand operation, the rate may be varied as desired.

Notwithstanding the extremely low temperatures of the congealed gas, and the rapidity at which the freezing is thereby accomplished, it is a surprising result that the mechanism will not become jammed by freezing. This is explained, since the syrup pump 25—26 is not subjected to excessive cold, only the warm syrup from bottle 13 flowing thereto and since the chilling action upon the chill jacket 21—37 ceases, promptly upon stopping the machine, whereupon any remnant of syrup left in the conveyor drains downward after melting.

In order to facilitate starting of the machine in warm weather, I prefer to provide in the front panel of the freezing compartment 11, a venting aperture 66 with a cover 67 adapted to be opened for starting. The vent aperture allows the chilled carbon dioxide gas from the ice chest 16 instead of overflowing past the rim 10' of said chest, to find a more ready path by passing lengthwise of the chill jacket 21—37, thereby expediting the initial freezing.

The invention may be applied to advantage for freezing sherbets, custard, ice cream, whipped cream and kindred substances, whether sweetened or not.

The conveyor has a wider field of application for feeding and propelling plastic substance generally and is claimed both per se and in combination with the rest of the mechanism.

It will thus be seen that there is herein described a method and an apparatus in which the several features of this invention are embodied, and which in action attain the various objects of the invention and are well suited to meet the requirements of practical use.

As many changes could be made in the above method and construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States of America, is:—

1. The method of preparing a frozen confection, which consists in disposing the substance to be frozen in heat interchange relation with respect to a surrounding heat abstracting medium, propelling both the medium and the substance through a continuous undulatory course relative to each other, and crushing the substance as it is frozen at substantially the center of the space surrounded by said medium.

2. The method of preparing a frozen confection which consists in conveying the substance to be frozen through an undulatory path and simultaneously therewith, subjecting it to a chilling action, while applying crushing pressure to substantially the center of the mass as it is being frozen.

3. The method of preparing a frozen confection, which consists in conveying the substance to be frozen through a draining passage in heat-interchange relation with a surrounding circulating brine, simultaneously crushing said substance at substantially the center of the space surrounded by said brine and abstracting the heat from the brine by contact with congealed medium normally in the state of a gas.

4. Apparatus for preparing a frozen confection, which consists of a conveyor affording clearance for draingage of liquid, means for holding a chilling medium in heat interchange relation with the entire length of said conveyor, means for supplying liquid to the intake of said conveyor, said apparatus having an outlet for the finished frozen product at the opposite end of the conveyor, and means for crushing said frozen confection substantially at the longitudinal central axis of the conveyor.

5. Apparatus of the character described, comprising a pair of upstanding conveyor rolls, each having an outstanding helical ridge, the ridges being spaced with respect to each other to afford drain passages therebetween and to afford a crushing action along a line between said rolls, heads constituting bearings for the respective rolls and a chill jacket encircling said conveyor assembly.

6. An apparatus for preparing a frozen confection, comprising an upstanding helical conveyor for the substance to be frozen, said conveyor having clearance for draining liquid, a chill jacket about said conveyor, and means for simultaneously operating the conveyor and circulating chilling brine through the jacket.

7. Apparatus of the character described, comprising a conveyor having an inlet for liquid at one end and an outlet for the frozen product at the other, a chill jacket in heat interchange relation with said conveyor, and interlocked means for feeding liquid to said conveyor, driving said conveyor and simultaneously therewith, circulating chilling brine through said chill chamber.

8. An installation for preparing a frozen confection comprising a conveyor for advancing the substance as it is being frozen, a pump for pumping the liquid into the conveyor, a spout for delivering the frozen product from the conveyor, a chill brine jacket encircling the conveyor, the conveyor comprising means for crushing the confection along substantially the longitudinal center line of the mass of the confection, an ice chest, and means for circulating the brine to cause it to give up abstracted heat to the ice chest.

9. An apparatus of the character described, including a chest for frozen carbon dioxide, means providing a continuous pipe passage of considerable length sustaining said frozen carbon dioxide, means for circulating brine through said pipe passage and a freezing compartment exterior to said ice chest and in heat-interchange relation with the circulated brine, said compartment containing conveyor means constructed and arranged to afford a crushing action on the contents of said compartment at substantially the longitudinal center line thereof.

10. In apparatus of the character described, a heat insulated chest having at the bottom thereof a sheet bent to form a continuous pipe or conduit of length considerably greater in length than the perimeter of said bottom, the sheet constituting the walls of said pipe substantially covering said bottom.

11. An apparatus for preparing frozen confections, comprising a unit including an ice chest and a freezing compartment, said freezing compartment including a conveyor for the substance to be frozen, a brine circulating system including a pipe delivering heated brine to the ice chest, a pump for circulating the brine and a jacket in heat-interchange relation with said conveyor, the latter including means for crushing said frozen substance along substantially the longitudinal center line of the conveyor.

12. In apparatus of the character described, a compact unit for preparing a frozen confection in a continuous process, from a liquid mix, said apparatus including an ice chest for containing carbon dioxide snow, a vertical conveyor for the substance to be frozen, means for feeding the liquid to be frozen to the lower part of said conveyor, said conveyor having clearance to drain liquid, and adapted to feed the freezing mass upward, a spout for delivery of the completely frozen mass from the top of the conveyor, a brine system for transferring heat from the conveyor to the ice chest, said system including a chill jacket about the conveyor, a pipe system at the bottom of the ice chest and a pump for propelling the brine.

13. In a brine circulating refrigerating system, a chest including a congealed medium to abstract heat from the brine, a conveyor for the substance to be frozen, means for operating the conveyor, a chill jacket encircling the conveyor and a pump for feeding the brine through said jacket, said conveyor having engaging surfaces for crushing said frozen substance along substantially the longitudinal center line of said conveyor.

14. In a low-temperature brine circulating refrigerating system, an ice chest containing carbon dioxide snow, a vertical conveyor for the substance to be frozen, a chill jacket about said conveyor, a brine pump for propelling the brine through the jacket and the ice chest, said brine pump being near the outlet end of said jacket where the brine is at maximum temperature.

15. In a refrigerating system, a double walled box forming a heat insulated ice chest, adapted to contain a congealed cooling medium, a piping system at the bottom of said chest upon which said congealed cooling medium is supported, said piping system being adapted for connection with a refrigerant circulating pump, said chest having means adjacent to points where the system enters the interior of the chest for escape of products of evaporation of said congealed cooling medium into the space between the walls of said box.

16. In a machine for making a frozen confection, the combination of a vertical conveyor constructed to drain liquid downward and to feed the freezing substance upward, a delivery spout at the upper end of said conveyor, a platform below said spout for intercepting the frozen product and small drain apertures in said spout for drain of any liquid from the frozen product.

17. A unit for preparing frozen confections in a single continuous process from a liquid mix, said unit comprising an ice chest containing solid carbon dioxide, a freezing compartment contiguous to said chest, and a liquid supply adjacent said chest and said compartment, said freezing chamber containing a vertical conveyor for the substance to be frozen, having an inlet at its lower end in communication with the liquid supply and having a spout at its upper end for ejection of the frozen product, a brine circulating system including elongated conduit means tortuously arranged within the bottom of the ice chest and serving as a support for the congealed carbon dioxide, a chill jacket about the conveyor, pumping means for forcing the brine through the length of said chill jacket and means inter-related with said pumping means for operating said conveyor simultaneously therewith.

18. The combination set forth in claim 17 in which the inlet for the brine to the jacket is at the lower end thereof, the outlet at the upper end thereof and in which the brine propelling means is a gear pump near the upper or outlet end of said conveyor.

19. In a low temperature refrigerating system, including a congealed cooling medium as the heat abstracting means and a mechanical pump as the circulating means; the combination of a brine circulating system including as the brine, a petroleum product, of low viscosity at ordinary temperature, said product congealing to a lubricating oil under the temperature of use and serving to lubricate the brine circulating pump.

20. In a low temperature refrigerating system, the combination of an ice chest having a congealed cooling medium therein; a freezing compartment adjacent said chest having an upstanding conveyor, a chill jacket about said conveyor, a circulating system for passing brine from said ice chest through said chill jacket, said freezing compartment having a venting aperture adjacent said chill jacket and at a level substantially that of the top of said ice chest, whereby the evaporated medium will pass along said chill jacket through said venting aperture to expedite the initial freezing in starting the mechanism.

21. A method of refrigeration which consists in moving a substance to be frozen in heat interchanging relation with a chilling medium and crushing the particles of said frozen substance at substantially the center of said substance as it is frozen.

HERBERT M. HILL.